United States Patent [19]

Wysong

[11] 3,922,607

[45] Nov. 25, 1975

[54] RADIO BROADCASTING SYSTEM

[75] Inventor: Ronald E. Wysong, Dayton, Ohio

[73] Assignee: R. L. Drake Company, Miamisburg, Ohio

[22] Filed: Aug. 14, 1974

[21] Appl. No.: 497,193

Related U.S. Application Data

[63] Continuation of Ser. No. 333,698, Feb. 20, 1973, abandoned.

[52] U.S. Cl. .................. 325/48; 325/55; 325/64; 179/1 SW

[51] Int. Cl.² .................. H04B 1/00

[58] Field of Search .................. 325/45–48, 325/53–55, 57, 64, 126, 344, 347–349; 179/1 SW, 18 BF

[56] References Cited

UNITED STATES PATENTS

| | | | |
|---|---|---|---|
| 2,630,525 | 3/1953 | Tomberlin et al. | 325/48 |
| 3,452,156 | 6/1969 | Engelbrecht | 325/47 |
| 3,493,681 | 2/1970 | Richards | 179/1 SW |
| 3,534,266 | 10/1970 | Halstead | 325/48 |
| 3,714,575 | 1/1973 | Rogalski | 325/53 |
| 3,729,680 | 4/1973 | McDonald | 325/57 |

*Primary Examiner*—Albert J. Mayer
*Attorney, Agent, or Firm*—Biebel, French & Bugg

[57] ABSTRACT

A method and apparatus for radio broadcasting including a transmitter which transmits substantially continuous program material, such as background music, on one subcarrier and a plurality of sequential messages, each accompanied by coded signals identifying its beginning and end, on a second subcarrier, and a receiver for receiving the continuous program material and the messages. A loudspeaker is connected to the receiver to reproduce the continuous program material until selected coded signals are received. An audio fader circuit is used to switch the loudspeaker between the continuous program material and the messages in response to the coded signals and does so by slowly increasing the magnitude of one while slowly decreasing the magnitude of the other. The coded signals may include a plurality of standby codes each directed to separate families of receivers and a release code common to all receivers whereby more than one family or receivers may reproduce a selected message simultaneously on their respective loudspeaker systems.

5 Claims, 8 Drawing Figures

RADIO BROADCASTING SYSTEM

This application is a continuation of Ser. No. 333,698 filed 2/20/73 and now abandoned.

BACKGROUND OF THE INVENTION

Commercial frequency modulation (FM) broadcast stations have the ability to broadcast a number of programs in addition to the program on the main channel (center of frequency), including FM stereo multiplex or one or more SCA (Subsidiary Communications Authorization) subcarriers. A commercial FM broadcast station will transmit normal program material on the main channel and may provide background music or other service for subscribers on one or more of the SCA subcarriers.

In some prior art systems, such as disclosed in U.S. Pat. Nos. 1,941,067; 2,617,923 and 2,630,525, background music may be interrupted by commercial messages directed toward selected customers with the commercial messages preceded or accompanied by an address code to mute those receivers not designated to receive the messages. one obvious drawback of these systems is the periodic interruption of the background music by the commercial messages resulting in long periods of silence at the customers' receivers not receiving the messages.

In other prior art systems, described in U.S. Pat. Nos. 3,496,467; 3,534,266 and 3,696,297, coded signals are used to enable selected receivers to receive subsequently broadcasted messages.

SUMMARY OF THE INVENTION

This invention relates to an improved method and apparatus, particularly adapted for FM SCA subcarrier use, wherein a large number of subscribers can be served with continuous background music and provided with commercial messages only directed specifically at them.

More particularly, in this invention, one SCA subcarrier is utilized to carry a first program, such as background music, and a second SCA subcarrier is utilized to carry second program material, such as commercial messages which are coupled with one or more address codes directed at specifically identified subscribers. Therefore, one subscriber may listen only to continuous background music while other subscribers may be provided with background music and selected commercial messages.

Two subcarriers are used, the subcarriers usually being provided by one commercial FM broadcast station, although one subcarrier from two separate FM broadcast stations may be used; the latter approach may be used if one or both of the stations involved are transmitting stereo programming.

At the transmitter, the main channel carries the public program, i.e., the program usually heard on normal FM receivers. A first subcarrier generator is modulated by a first program, such as background music, while a second subcarrier generator, at a different frequency, is modulated with a second program, such as commercial messages. The commercial messages on the second subcarrier are preceded by an address code directed toward specifically identified subscribers. The second subcarrier also contains a signal which causes the receiver to revert back to normal programming once a particular message has concluded.

At the receiver, the signals are demodulated and separated into their individual components (main channel audio, first subcarrier audio and second subcarrier audio). The program material carried by the first subcarrier is directed through a switching circuit to an audio amplifier and speaker system. The program material carried by the second subcarrier is also directed through the switching circuit to the audio amplifier and, in addition, this information is directed to a decoder circuit which detects the presence of a proper address code for that receiver. The decoder circuit controls the operation of the switching circuit and therefore controls which program material is directed to the audio amplifier.

In one variation of this invention, a second audio amplifier, normally muted, is connected to receive the program material on the second subcarrier, with the amplifier being unmuted only upon receipt of a special coded signal. This embodiment will be referred to hereinafter as the conference call mode of operation and may be used in chain stores or other similar businesses where a second loudspeaker, located in the manager's office, for example, reproduces a message directed to the manager without interrupting the background music playing in the store.

It is also within the scope of this invention to provide for a multiple address mode of operation. In this case, two decoding circuits are used, one to respond to a standby address code unique to a group of subscribers, and the other to respond to a release address code common to all receivers operating with this mode. Serial transmission of the standby address codes will place all the selected receivers in a standby mode, and transmission of the release address code will cause all the selected units to switch at that time to the program material carried by the second subcarrier. When using the multiple address mode of operation, subsequent address codes are not heard on the receivers of subscribers which have already been selected in a sequence of codes since the transition from one subcarrier to the other is only accomplished upon receipt of the release address code.

The switching circuit used in the preferred embodiment of this invention, referred to hereinafter as an audio fader circuit, has two inputs and a single output. Upon the detection of the proper address code by the decoder, a signal is sent to the audio fader circuit to cause the program material on the first subcarrier to slowly decrease in level while the program material on the second subcarrier will slowly increase in level. This smooth transition from one program channel to the other is more pleasing to the listener than an abrupt transition. At the conclusion of the message, the signal which caused the fading action is removed to cause the program material on the first subcarrier again to increase in level slowly while the second subcarrier signal is decreased slowly. As a practical matter, only the background music will change in level since the messages on the second subcarrier will normally begin only after the transition to the second subcarrier has been completed.

In a preferred embodiment of the invention, the address code is a three or four digit code generated by a two frequency signal source, while the end of the message signal is generated by momentary lowering of the carrier level on the second subcarrier.

It is therefore an object of this invention to provide an improved broadcasting system, particularly adapted for FM SCA subcarrier use, wherein one subcarrier is modulated with substantially continuous program material, such as background music, and another subcarrier is modulated with sequential messages, each message having associated therwith a coded address signal; to provide a receiver which includes means for demodulating the substantially continuous program material and the sequential messages, a decoder circuit responsive to selected coded address signals, a loudspeaker system, and means for switching the loudspeaker system between the continuous program and the sequential messages under control of the decoder circuit; and to provide an improved audio switching circuit for use in the system previously described wherein an output from the decoder circuit upon receipt of the proper coded address signal will cause the audio on the loudspeaker system from the substantially continuous program material to reduce in volume slowly and smoothly as the message material increases in volume, and to restore the continuous program material slowly and smoothly upon the completion of the messages.

Other objects and advantages of the invention will be apparent from the following description, the accompanying drawings and the appended claims.

DESCRIPTION OF THE PREFERRED EMBODIMENT

Figure 1:
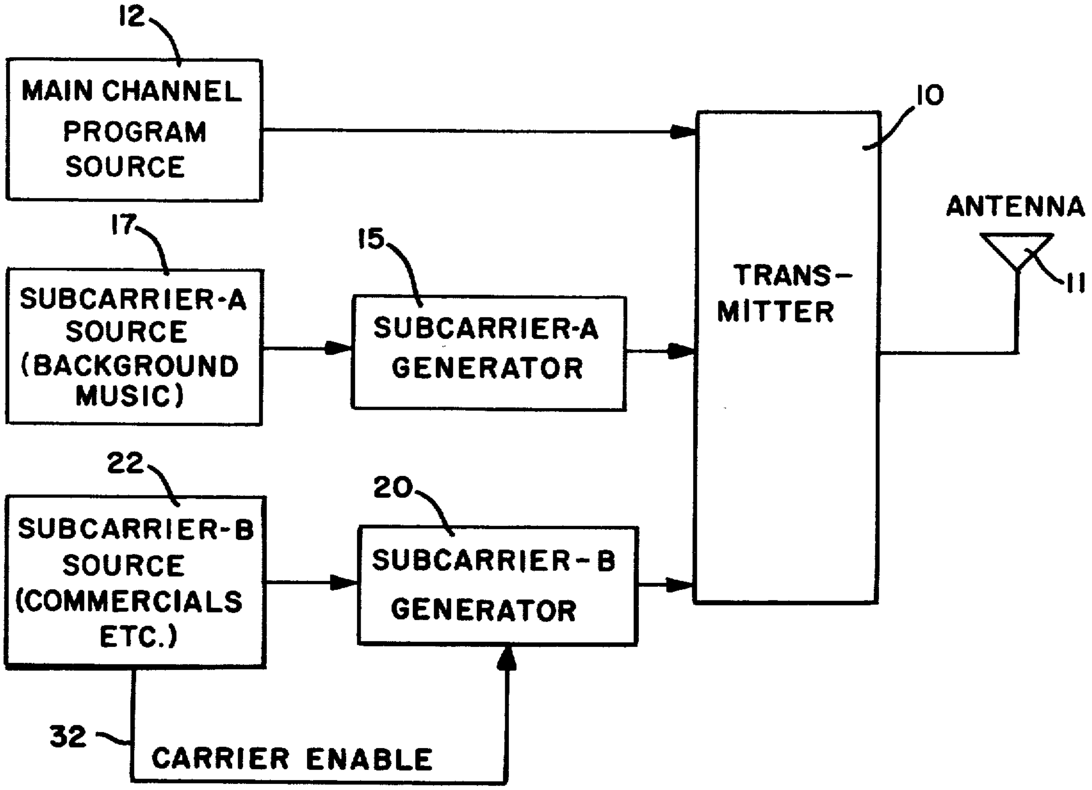
FIG. 1 is a block diagram of an FM transmitter including means to broadcast on a main channel and two subcarriers.

Reference is now made to the drawings which illustrate preferred embodiments of the invention and particularly to FIG. 1 which is a block diagram of a transmitter used in connection with this invention. A frequency modulated (FM) transmitter 10 is connected to antenna 11 and includes a main channel program source 12 for broadcast on the main channel of the transmitter. The main channel program is the one received on conventional FM receivers.

As is well known in FM broadcasting, an FM transmitter may also broadcast several other programs on subcarriers of the main channel. These subcarriers are generally at specified frequencies authorized by the FCC under the subsidiary communications authorization (SCA), and allow the simultaneous broadcast of other information, such as background music, commercial messages, educational material, etc. Reception of the programming on the SCA channels requires additional equipment within an FM receiver and is usually provided on a subscription basis.

In FIG. 1, a first FM subcarrier is generated by a subcarrier generator 15, typically modulating transmitter 10 at 67 kHz, and is modulated with substantially continuous program material, such as background music, from a program source 17. A second subcarrier generator 20, typically operating at 42 kHz, is modulated with sequential program material, such as commercial messages, news, etc., from program source 22.

Figure 2:
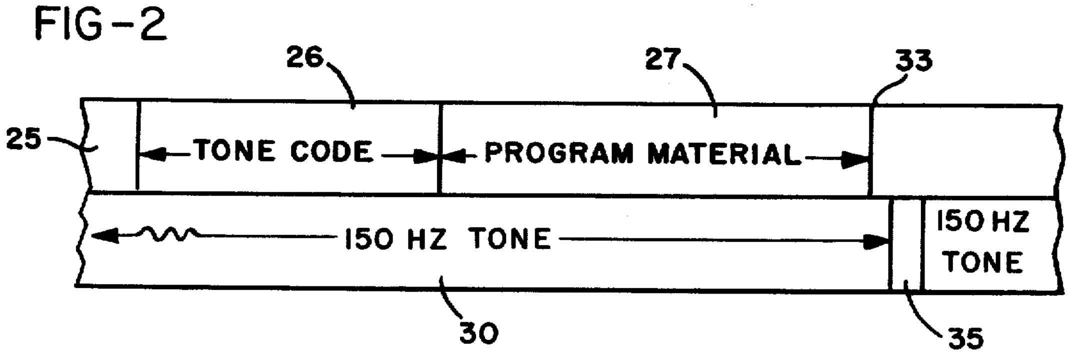
FIG. 2 represents a tape recording used as the program source for the second subcarrier of the transmitter shown in FIG. 1.

In one embodiment of the invention, the second subcarrier program source 22 is a two track magnetic tape recording, as illustrated in FIG. 2, with one track 25 including a tone coded address 26 followed by program material 27. A second track 30 includes a tone 31 continuously present during the tone coded address and program material. This tone is used to maintain the carrier level of the second subcarrier generator 20 at a specified level by means of a signal on carrier enable line 32 (FIG. 1). At the conclusion of the program material, shown at 33, the tone 31 on the second track 30 is terminated for a short period of time 35, and this causes the level of the subcarrier signal from the generator 20 to be reduced momentarily from six to ten decibels. This lowering of the subcarrier level will generate a reset signal in the receiver, as will be explained later.

Thus, the transmitter shown in FIG. 1 is capable of providing a continuous public broadcast on the main channel, a continuous broadcast, such as background music, on a first subcarrier, and commercial messages, conference calls, or other information on a second subcarrier.

By designing a receiver in accordance with this invention, the program provided by subscription on the first subcarrier can be heard in a number of stores or business establishments, and this program will be interrupted by the program material on the second subcarrier only at those stations selected by an address code preceding that material.

Thus, background music may be played simultaneously in a doctor's office, a grocery store, and a drug store, no commercial message would interrupt music playing in a doctor's office, a commercial message may be directed specifically to the grocery store without interfering with the background music to either of the other two locations, or a commercial message common to both the grocery store and the drug store may interrupt the background music in those two locations at the same time without being heard in the doctor's office or without causing a silent period to be created.

Figures 3, 4:
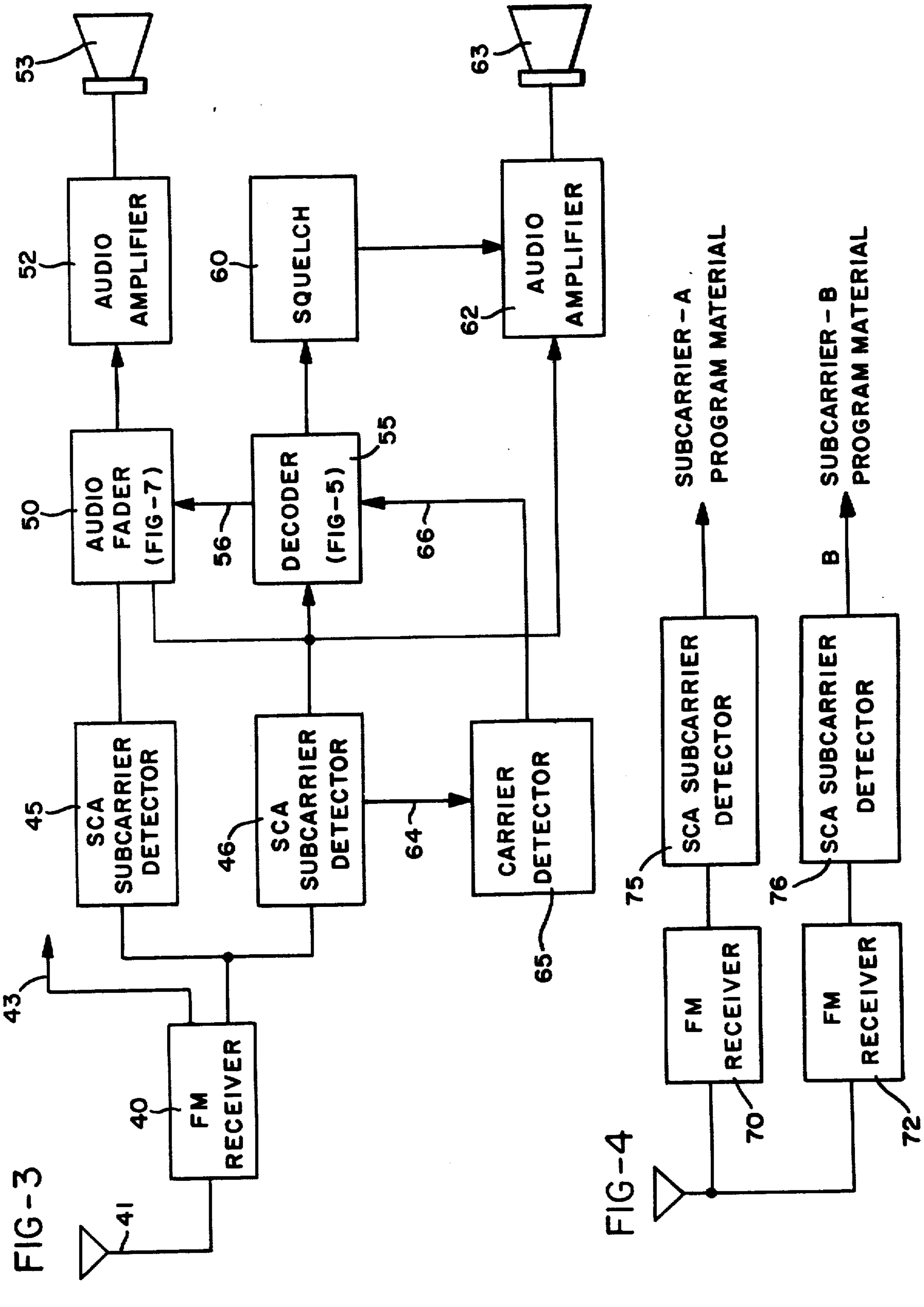
FIG. 3 is a block diagram of a receiver constructed in accordance with the teachings of the invention.
FIG. 4 is a block diagram of an alternate embodiment of the invention.

Reference is now made to FIG. 3 which is a block diagram of a receiver system constructed according to this invention where an FM receiver stage 40 is shown connected to a receiving antenna 41. The receiver may include a first output 43 containing the program on the main channel, but this program normally is not used in business establishments of the type subscribing to a background music service.

The output of the FM receiver is also directed to two subcarrier detector circuits 45 and 46. Detector 45 demodulates the program material carried on the first subcarrier while detector 46 demodulates the program material carried on the second subcarrier. The outputs from detectors 45 and 46 are audio signals and are both applied to a switching circuit or audio fader circuit 50. The audio fader will be described in more detail later, and its function is to select one or the other of the audio signals applied thereto and to direct this signal to an audio power amplifier 52, the output of which is connected to a loudspeaker system 53.

The output of the second subcarrier detector 46 is also applied to a decoder circuit 55. This circuit responds to the tone coded address 26 and has a first output 56 for controlling the operation of the audio fader 50, and a second output 57 for controlling squelch circuit 60. When the proper address code is detected, a signal on line 56 will cause the audio fader to reduce slowly the level of the audio signal from the first subcarrier detector 45 and to increase slowly the audio signal from detector 46.

Another audio output of the second subcarrier detector 46 is directed to a power amplifier 62, the output of which is connected to a loudspeaker system 63. Power amplifier 62 operates under the control of the squelch circuit 60, and therefore the information on the second subcarrier is not heard over the speaker 63 unless the proper tone coded address is received to operate the squelch circuit 60 and unmute the amplifier 62.

Another output 64 of the second subcarrier detector 46 is applied to a carrier detector circuit 65. This circuit responds to a momentary decrease in the level of the second subcarrier and provides on output on line 66 to reset the decoder 55 and thereby to cause the audio fader 50 to redirect the program on the first subcarrier to the power amplifier 52 and speaker 53.

Reference is now made to FIG. 4 which illustrates an alternative embodiment employing two FM receivers, each tuned to a different frequency or station. In some localities, FM stereo multiplex may be carried by all of the available FM stations, and in this situation, only one SCA carrier would be available at each station to carry either background music or commercial messages. In this situation, more than one FM transmitter could be utilized, with one transmitter carrying background music on its available subcarrier, and a second transmitter carrying the commercial messages on its available subcarrier. Two FM receivers 70 and 72 would be used, with a subcarrier detector 75 detecting and converting into audio signals the information carried by the subcarrier of the first transmitter and a second subcarrier detector 76 detecting and converting into audio signals the information carried by the subcarrier of the second transmitter. The outputs of these two detectors 75 and 76 are utilized in the same manner as the outputs of detectors 45 and 46. A third subcarrier may also be employed to carry the commercial messages where the number of messages carried by the second subcarrier completely fills the time available, or in other words, as many subcarriers as necessary may be used to carry the commercial messages.

Figures 5, 7:
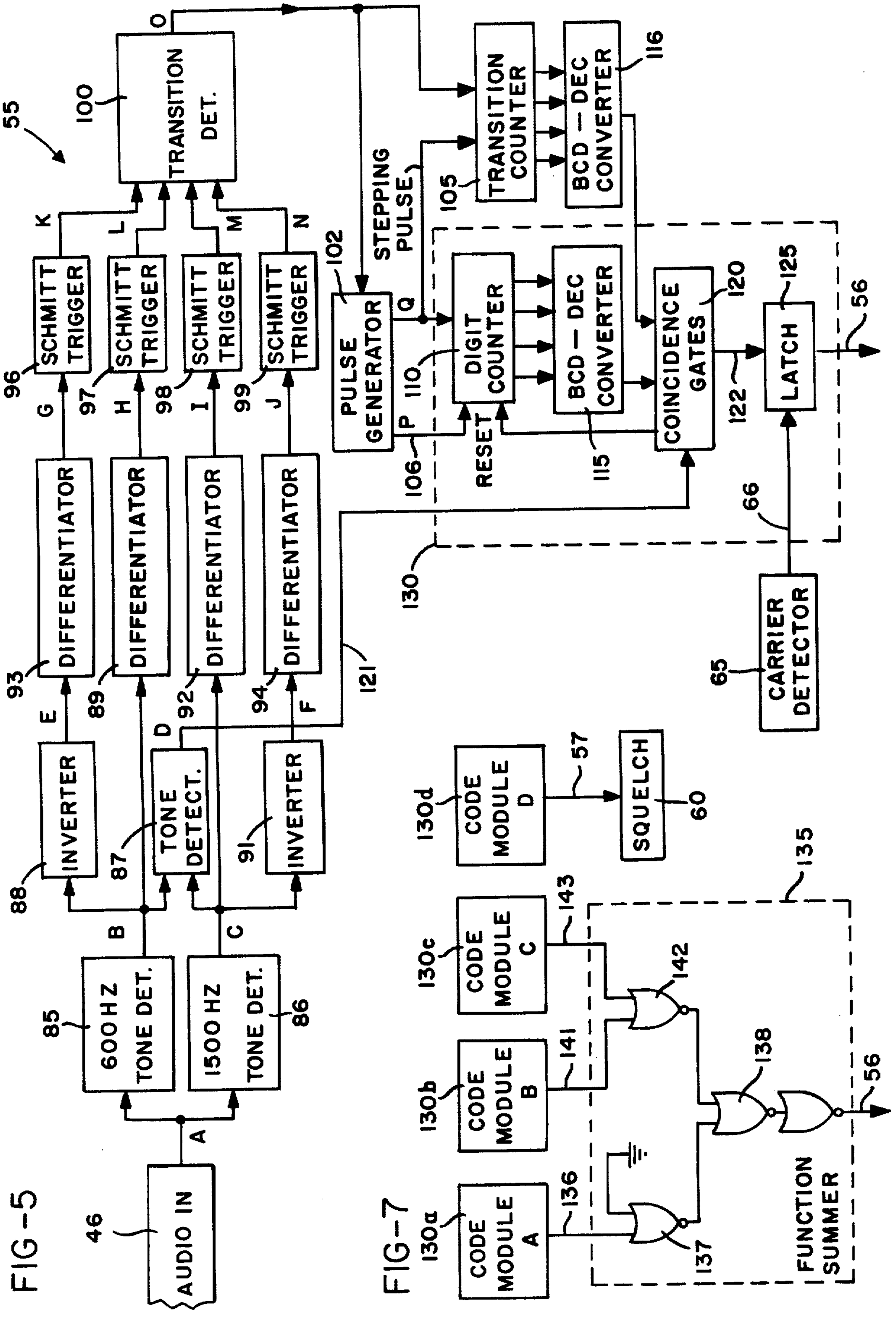
FIG. 5 is a block diagram of a decoder circuit used in the receiver of FIG. 3.
FIG. 7 is a block diagram of a portion of a decoder circuit wherein a plurality of code modules are included to provide for single and multiple address modes of operation and conference calls.

Reference is now made to FIG. 5 which is a block diagram of one form of decoder circuit used to accomplish the method of the present invention. The function of the decoder circuit is to analyze the tone coded address signal preceding a message and to cause the audio fader circuit to switch the signal applied to the audio amplifier 52 from the first subcarrier to the second subcarrier upon the receipt of the proper coded message; the transition from one source to the other being made smoothly and slowly, one source slowly decreasing an audio level while the other slowly increases in audio level.

In the embodiment of the invention disclosed herein, a tone coded address having either three or four digits is used to select the proper receivers for receiving the message contained in the second subcarrier. A tone coded address signal is a series of tones having a frequency of either 600 Hz or 1500 Hz. Only the transition for one tone to the other is used to indicate a digit. Each digit of the address number consists of a series of tone transitions numbered from one through ten. These tone transitions may be generated at the transmitter by a pair of oscillators connected to a telephone type dial, thus allowing an operator to dial the three or four digit code representing a particular subscriber. Of course, other forms of addresses could be used in accordance with the broad outline of the invention described herein.

Figure 6:
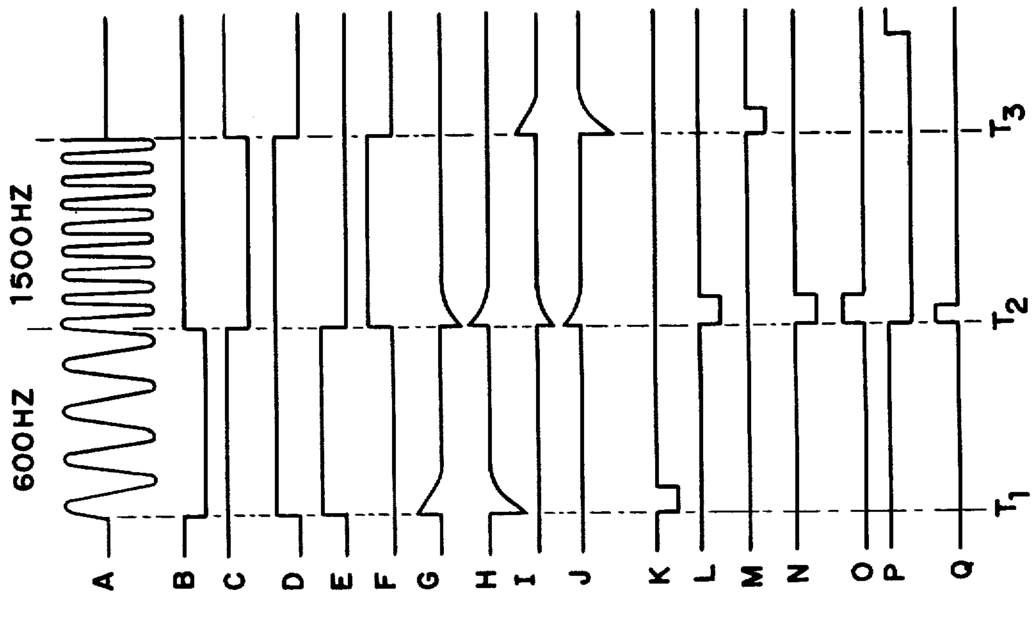
FIGS. 6A–6Q are output waveforms of several of the components in the decoder circuit of FIG. 5.

The output waveform from the second subcarrier detector 46 is shown in FIG. 6, waveform A, with a 600 Hz tone starting at time T1, the transition of a 600 Hz tone to the 1500 Hz tone occurring at time T2, and termination of the 1500 Hz tone at time T3. The output of the detector 46 is applied to a 600 Hz tone detector 85 and a 1500 Hz tone detector 86. The output of the 600 Hz tone detector 85 is shown by waveform B in FIG. 6 and is applied to a tone detector 87, inverter 88 and a differentiator 89. Similarly, the output of the 1500 Hz tone detector 86, shown by waveform C in FIG. 6, is applied to the tone detector 87, inverter 91 and differentiator 92. The outputs of the inverters 88 and 91, shown by waveforms E and F in FIG. 6, are applied to differentiators 93 and 94, respectively. The outputs of the differentiators 93, 89, 92 and 94, shown by waveforms G, H, I, and J, respectively, are applied to Schmitt trigger circuits 96, 97, 98 and 99, respectively, and these devices are all connected to a transition detector 100. The waveforms of the outputs from the respective Schmitt triggers are shown in FIG. 6, waveforms K, L, M and N.

In the particular embodiment of the invention shown in FIG. 5, the transition detector 100 produces an output (waveform O in FIG. 6) only when a transition occurs from a 600 Hz to a 1500 Hz or from a 1500 Hz to a 600 Hz, as at time T2, but does not produce an output when the 600 Hz tone begins (T1) or when the 1500 Hz tone terminates (T3).

The output of the transition detector 100 is applied to a pulse generator 102 and a transition counter 105. The pulse generator has two outputs, the first being a digit pulse 106, shown by a waveform P in FIG. 6 which is applied as a reset input to digit counter 110. A second output or stepping pulse 111, shown by waveform Q, is applied to both digit counter 110 and transition counter 105. The existence of the digit pulse on line 106 allows a stepping pulse on line 111 to increase the count in the digit counter 110 by one.

The stepping pulse resets the transition counter to zero so the number of tone transitions can be counted. The count in the transition counter corresponds to the value of the digit, i.e., 1–10.

The output of both the digit counter 110 and the transition counter 105 are in binary coded decimals (BCD) form, and these outputs are converted into decimal form by means of converters 115 and 116.

The decimal outputs of these converters are applied to coincidence gates 120 which are preprogrammed with an address number to be compared to the transmitted address number. Also, gates 120 are enabled only when an output on line 121 exists from tone detector 87. If the address numbers are identical, an output from the coincidence gate 120 will be applied on line 122 to a latch circuit 125.

The latch 125 also has an input on line 66 from the carrier detector 65 to cause the latch to reset when the carrier level of the second subcarrier is momentarily lowered.

The digit counter 110, the BCD converter 115, the coincidence gate 120 and latch 125 are all contained on a common printed circuit board and form a code module 130.

For the single address mode of operation, only code module 130 is required for each receiver, as shown in FIG. 5. For a multiple address mode of operation, the circuit shown in FIG. 7 may be used. FIG. 7 is a block diagram showing three code modules 130*a*–130 *c* each having an output connected to a function summer 135 and a fourth code module 130*d* having an output connected to a squelch circuit 60.

In FIG. 7, code module 130*a* responds to a single address code, and its output 136 is connected through gate 137 to gate 138. Since gate 137 has only one input, an output on line 56 will be generated immediately upon sensing the proper code.

Code module 130*b* responds to a standby address code, and its output on line 141 is connected to gate 142. Several standby address codes will be transmitted in sequence to enable receivers of several groups or families, but the subsequently transmitted address codes will not be heard over the loudspeakers of the receivers previously enabled since a fade signal is not yet generated. A release code, common to all receivers equipped for the multiple address mode of operation, is detected by code module 130*c*, and its output on line 143 is also applied to gate 142 which now provides an output to gate 138 to cause a fade signal on line 56.

Code module 130*d* responds to a conference call code, and its output on line 57 will be applied directly to squelch 60 in a conference mode of operation to allow a separate speaker 63 to become operative and to carry the information transmitted on the second subcarrier.

Figure 8:
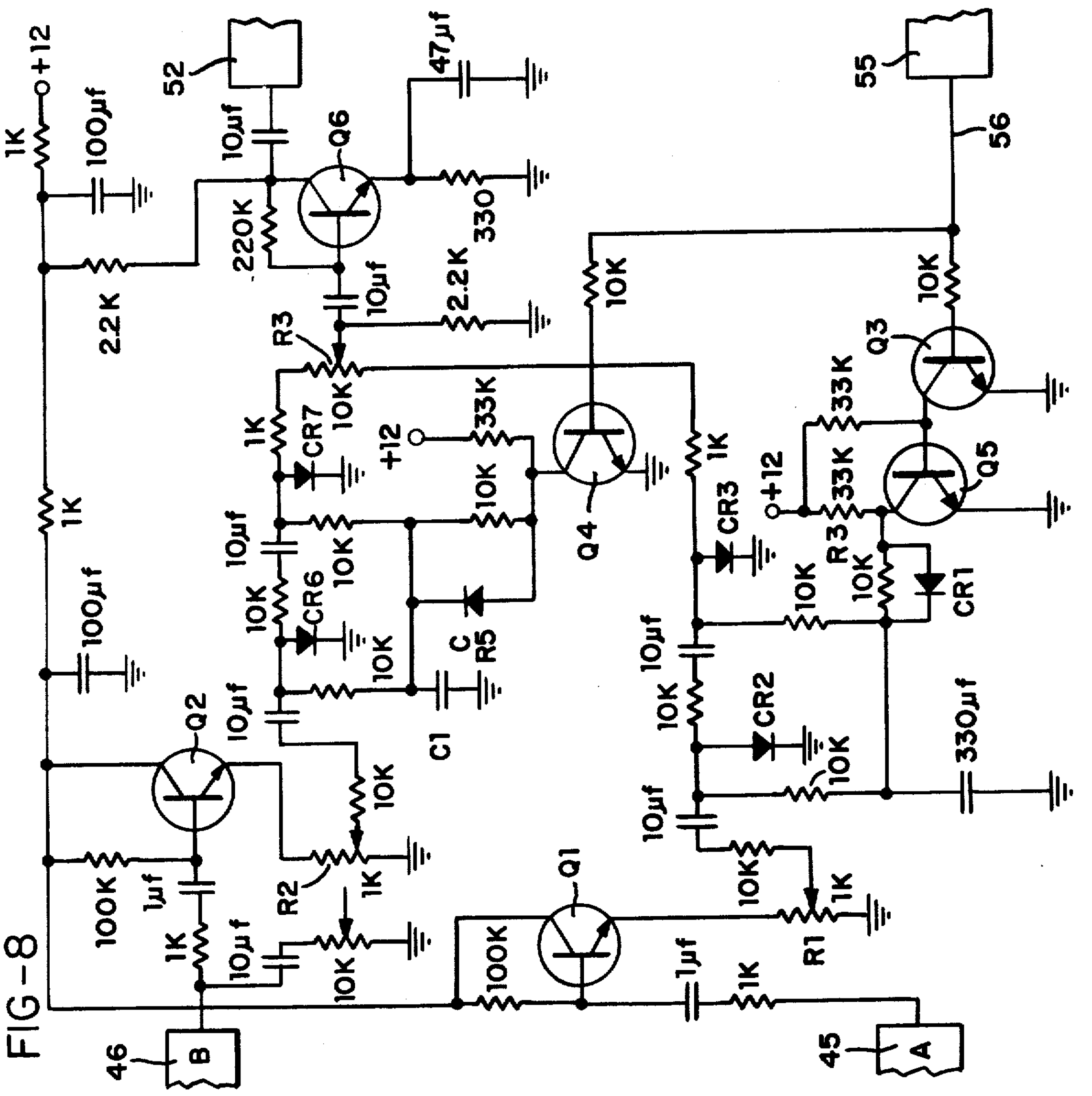
FIG. 8 is an electrical schematic diagram of an audio fader circuit used in the receiver of FIG. 3.

The fade signal on line 56 is directed to a switching circuit, such as the audio fader circuit 50, shown in FIG. 8. The audio fader circuit is provided with two audio signals, one from the first subcarrier detector 45, the other from a second subcarrier detector 46, and has an audio output 51 to audio amplifier 52.

The audio signal from subcarrier detector 45 is applied to the base of transistor amplifier Q1 while the output of detector 46 is applied to the base of transistor amplifier Q2. These two transistor amplifiers are connected in emitter follower configuration, and their outputs are adjustable audio signals, as determined by potentiometers R1 and R2.

Under normal operating conditions, i.e., when listening to the program material on the first subcarrier, the signal on line 56 from the decoder 55 is in a logic zero state and transistors Q3 and Q4 are gated off to allow their collectors to be high. A high collector voltage on Q3 will cause transistor Q5 to be gated on and discharge any energy stored in capacitor C2. This removes any DC voltage from diodes CR2 and CR3, and therefore the audio signal from the center tap of potentiometer R1 is allowed to pass to the base of audio preamplifier transistor Q6 through the balancing potentiometer R3.

The high collector voltage on transistor Q4, on the other hand, places a DC bias on diodes CR6 and CR7 which attenuate the audio signal from transistor Q2 and thus prevent this signal from being applied to the audio preamplifier Q6.

When a fade control signal on line 56 exists (upon receipt of the proper coded address signal), this line will go from a logic zero state to a logic one state and gate both transistors Q3 and Q4 into conduction. Transistor Q3 causes transistor Q5 to gate off and allows capacitor C2 to charge through resistor R3. As capacitor C2 charges, diodes CR2 and CR3 are slowly forward biased through resistors R4 and R5, respectively, with the result that the audio signal on the main subcarrier is gradually attenuated.

At the same time, transistor Q4 is gated on and discharges capacitor C1 through resistor R6. This discharging action slowly removes the forward bias on diodes CR6 and CR7 which causes the audio signal from the second subcarrier, from the center tap of potentiometer R2, to gradually increase in level as it is applied to the input of audio preamplifier Q6. The audio signals levels applied to the fader network are kept low enough to prevent diodes CR2, CR3, CR6 and CR7 from producing distortion.

When the fade signal on line 56 is removed, caused as explained above by momentarily lowering the magnitude of the second subcarrier, the reverse of the above described operation will occur and a smooth transition from the audio from the second subcarrier to the audio from the first subcarrier will take place.

The coded address signal is not heard over the loudspeaker system since, at the time the address signal is transmitted over the second subcarrier, the loudspeaker is connected through the audio fader to the first subcarrier detector. At the conclusion of the commercial message, rather than generating an end of message code in the form of an audio tone which could be heard through the loudspeaker, the carrier level is lowered momentarily, the amount of lowering being sufficient to generate a fadeback signal but not sufficient to cause noise in the audio from the second subcarrier.

While the method herein described, and the form of apparatus for carrying this method into effect, constitute preferred embodiments of the invention, it is to be understood that the invention is not limited to this precise method and form of apparatus, and that changes may be made in either without departing from the scope of the invention which is defined in the appended claims.

What is claimed is:

1. A broadcast system comprising
a transmitter including
- means for generating a first radio frequency signal,
- means for modulating said first radio frequency signal with substantially continuous program material,
- means for generating a second radio frequency signal,
- means for modulating said second radio frequency signal with sequential messages and tone coded address signals identifying the beginning of each of said sequential message; said tone coded address signals including a plurality of standby codes, each directed to a separate family of receivers, and a release code common to all receivers of a predetermined group of families, said plurality of standby codes being transmitted sequentially and followed by a single release code;
- means for momentarily lowering the magnitude of said second radio frequency signal at the conclusion of each said sequential message;

a plurality of receivers each including first means for receiving said first radio frequency signal and for producing a first audio output of said continuous program material, second means for receiving said second radio frequency signal and for producing audio output including both said sequential messages and said coded address signals, a loudspeaker system, decoding means responsive to selected tone coded address signals and to the magnitude of said second audio frequency signal, said decoding means in said receiver including at least one means responsive to selected said standby codes and means responsive to said release code whereby upon receipt of both said selected standby code and said release code an output is produced, and switching means responsive to said output of said decoding means and connected to the audio outputs of said first and second receiving means and having an output connected to said loudspeaker system, said switching means includes means for slowly lowering the magnitude of said first audio output to said loudspeaker system while slowly increasing the magnitude of the second audio output to said loudspeaker system upon receipt of selected tone coded address signals occurring at the beginning of a message, said means slowly increasing the level of the first audio output and at the same time decreasing the level of the second audio output upon detecting the lowering of the magnitude of said second radio frequency signal at the end of each message.

2. A broadcast system comprising a transmitter including, means for generating a first radio frequency signal, means for modulating said first radio frequency signal with substantially continuous program material, means for generating a second radio frequency signal, means for modulating said second radio frequency signal with sequential messages and tone coded address signals identifying the beginning of each said sequential message, said tone coded address signals include a plurality of standby codes each directed to a separate family of receivers and a release code common to all receivers of a predetermined group of families, said plurality of standby codes being transmitted sequentially and followed by a single release code;

a plurality of receivers including first means for receiving said first radio frequency signal and for providing a first audio output of said continuous program material, second means for receiving said second radio frequency signal and for providing a second audio output including said sequential messages and said tone coded address signals, a loudspeaker system, switching means connected to said audio outputs of said first and second receiving means and having an output connected to said loudspeaker system, and decoding means connected to said second receiving means and responsive to selected tone coded address signals for controlling the operation of said switching means, said decoding means in said receiver includes at least one means responsive to selected said standby codes and means responsive to said release code whereby upon receipt of both said selected standby code and said release code, said decoding means operates said switching means.

3. The system of claim 2 wherein said transmitter is a frequency modulation transmitter and wherein said first and second radio frequency signals are subcarriers of said transmitter's main carrier.

4. The system of claim 2 wherein said switching means includes means for slowly lowering the magnitude of said first audio output while slowly increasing the magnitude of the second audio output upon receipt of said tone coded address signal representing the beginning of a message, said means slowly increasing the level of the first audio output and at the same time decreasing the level of the second audio output upon receipt of a signal representing the end of said message.

5. The system of claim 4 including means for lowering momentarily the magnitude of the second radio frequency signal at the conclusion of each said sequential message, and further including means responsive to the output of said second receiving means for generating a signal representing the end of said message.

* * * * *